March 17, 1959 G. E. BARNHART 2,878,085
FLEXIBLE SEALING RING ARRANGEMENT
Filed Aug. 1, 1955
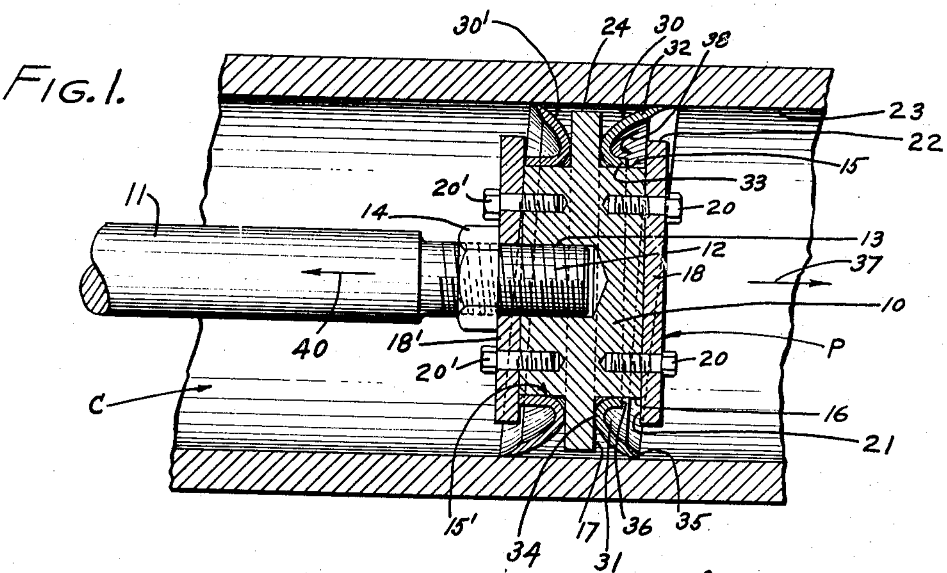
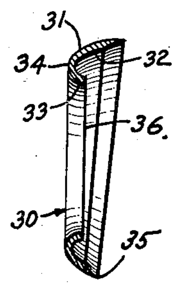
FIG. 3.
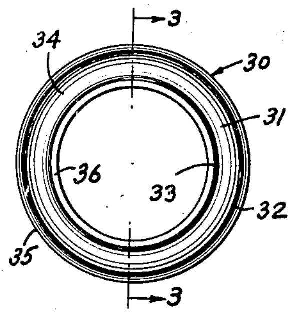
FIG. 2.
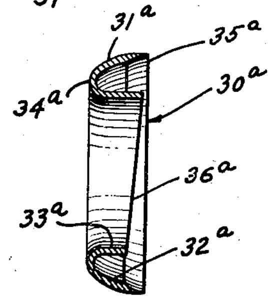
FIG. 4.
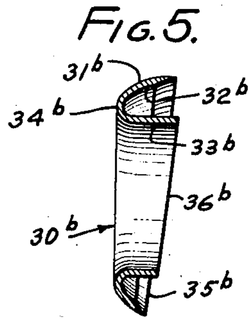
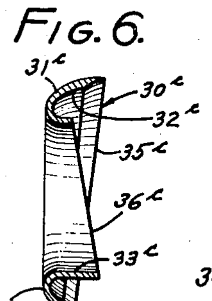
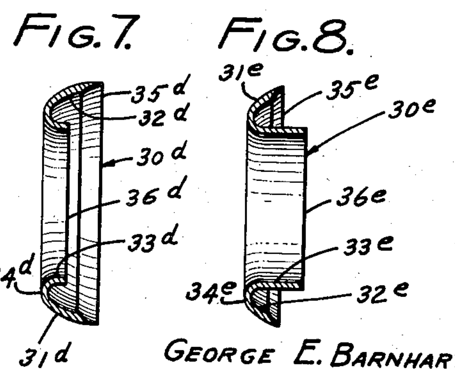
GEORGE E. BARNHART
INVENTOR.
BY [signature]
AGENT Patented Mar. 17, 1959

2,878,085

FLEXIBLE SEALING RING ARRANGEMENT

George E. Barnhart, Altadena, Calif.

Application August 1, 1955, Serial No. 525,458

12 Claims. (Cl. 309—33)

This invention has general utility in the field of sealing arrangements and relates generally to such an arrangement adapted for use between relatively movable members. More specifically, the invention relates to a sealing ring arrangement adapted for use in connection with members that are slidably disposed, one within the other.

In various types of specialized sealing situations, many attempts have been made for a considerable period of time toward the provision for adequate sealing between relatively moving, generally annular members, contemporary necessities having dictated requirements for such an arrangement that will operate effectively in many situations and especially in instances wherein extreme temperature changes, high pressures, thin walled structures and the like are encountered. Heretofore, devices intended for similar purposes have taken the form of split type sealing rings, as for example those used in connection with the pistons of reciprocating engines, packings and/or sealing rings that are also usually split, O-rings of metal, rubber or other resilient soft materials and the like. In each case, these prior structures have presented serious difficulties in specific particular installational situations, have failed to be effective in the performance of the desired sealing action under all conditions of use and have, in most cases, been constructed in such a manner and possessed with a function depending entirely upon the ring per se and the action thereof in connection with a surface along which the ring is to be used.

In regard particularly to piston rings, it is well known that such rings rely for their effectiveness upon the split opening in the periphery thereof to permit expansion and contraction during use with this type of ring eventually assuming a permanent set and being thus quite ineffective for the purpose desired. Additionally, in rings of this type, as wear occurs where the rings are susceptible to a radial outward repositioning of the peripheral portion thereof, thus to increase the gap formed between annular ends of the ring and permitting fluids to pass thereby through this gap. This situation is intolerable in many installational circumstances such as for example, in hydraulic cylinders or cumulators where high pressures must be held or in situations wherein fluids must constantly be maintained at a constant pressure level and without pressure loss.

In another instance, the other types of sealing rings or packings also have serious disadvantages relative to the necessity for diagonal slits or slots or other types of openings in the peripheries thereof to enable assembly on a piston or other mechanism with these particular types of sealing rings being generally made of soft material and possessed with undesirable deformation qualities in order to fulfill present day needs. Here, again, considerable wear and permanent sets are encountered in the use of this type of sealing ring, thus preventing their use in high pressure situations. The rubber types of rings, like the V-shaped packings, and O-ring type seals, are also ineffective under temperature change situations wherein deterioration due to the presence of heat and/or cold results in ineffective sealing properties between the relatively moving articles with which such sealing arrangements are used.

It therefore becomes quite evident that known types of sealing arrangements employing various types of openings, sliding points, or other factors to permit radial expansion and contraction of the rings, will not fulfill the requirements of contemporary mechanisms, especially those mechanisms employed in connection with aircraft, missiles, rockets and in other fields wherein high pressure, high temperature, low temperature and other conditions are encountered. Accordingly, it has become extremely necessary that a new type of sealing structure be provided that will meet these composite requirements and still be relatively light in weight, and still be an effective sealing arrangement to enable use in all sealing situations.

Accordingly, it is one important object of the invention to provide a novel sealing ring arrangement having properties and functional characteristics to overcome the deformation difficulties in prior like structures and enable use in the various defined contemporary situations.

It is another important object of the invention to provide a sealing ring having the property of distortion longitudinally as deformation is applied in a radial or circumferential direction, such distortion being in a direction to effect greater sealing due to changes in temperature or pressure or due to wear of the ring.

It is another important object of the invention to provide a sealing ring having features of novelty and physical characteristics to enable sealing between relatively moving members, the sealing ring being of metal having characteristics permitting distortion longitudinally to enable more pressure for sealing against such a wall.

A further important object of this invention is to provide a distortable sealing structure for relatively movable members wherein application of force or operating media thereto, by reason by relative movement or existence of fluid pressure, will act to deform the sealing arrangement in a direction of the specific configuration thereof.

It is still another important object of this invention to provide a metallic sealing member that is of greater diameter than a cylinder in which it is to be inserted, said greater diameter of the member providing such member with means to maintain pressure on a cylinder wall at all times.

It is a still further important object of the invention to provide a sealing arrangement wherein a sealing ring or member associated therewith has a peripheral size created a negative differential relative to structures with which such members are to be used.

Another important object of the invention is to provide a sealing ring having edges thereof disposed an angle other than a normal to a symmetrical axis thereof, whereby to insure a wiping action on surfaces with which such sealing ring must operate and permit easier breakout and movement thereof under various temperature and pressure conditions.

Still another important object of the invention is to provide a sealing ring having resilient characteristics to compensate for varying heat or cold situations and maintain constant pressure on cylinder wall bores along which such ring operates.

A further object of the invention is to provide a sealing ring means that is unbroken in its circumferential diameter, greater in diameter than the cylinder in which it is to be inserted and so shaped that it will distort in a longitudinal direction to permit its insertion into a cylinder or about a rod, the longitudinal distortion acting as a means for maintaining a spring type of compression or expansion on the ring in order that the ring may, in turn, maintain pressure on the cylinder wall.

Still another object of the invention is to provide a distortable metallic wall pressure exerting means with the construction thereof permitting exertion of force by pressure operating media and wherein this means is open and in contact with the pressure media.

Other and further important objects of the invention will become apparent from the disclosures in the following detailed specification, appended claims and accompanying drawing, wherein:

Figure 1 is a longitudinal sectional view of a cylinder and piston arrangement showing one form of ring of the present invention incorporated therewith;

Fig. 2 is a front elevational view of the ring of the invention on a reduced scale;

Fig. 3 is a sectional view through one form of the present ring as taken substantially as indicated by line 3—3, Fig. 2;

Figs. 4, 5, 6, 7 and 8 are sectional views similar to Fig. 3 showing alternative arrangements for the ring of the present invention.

In many types of cylinder and piston combination arrangements, the existence of temperature changing situations, extreme pressure, and maintenance of constant pressure has seriously hampered the movement of the piston relative to the cylinder in view of the necessity for a sealing arrangement therebetween. In other words, with a piston positioned within a cylinder and utilizing the usual heretofore well known types of sealing rings discussed hereinbefore, rings made of soft material frequently distorted into various undesirable shapes, not only destroying the sealing properties but also frequently cutting or destroying the ring per se.

Additionally, when effort was made to move the piston or the cylinder relative to the other of these members, considerable difficulty was experienced in initial breakout pressure required for such movement due to permanent sets in the ring material, the heretofore described undesirable distortion thereof, the force of pressure acting upon portions of the ring whereby to create a binding situation, or many other factors.

In other instances, it is desirable that portions of cylinders be maintained in a completely dry state while other portions be adapted to maintain a suitable liquid. In order that this characteristic may be maintained, it is necessary that sealing arrangements be of such characteristics as to wipe the walls of the cylinder as they are moved therealong. For the reasons set forth hereinbefore, prior like sealing arrangements intended for a similar purpose have been ineffective for the complete job necessary with manufacturers having to be content with at least some moisture in areas where it would be more advantageous to eliminate this moisture. Obviously, the same situation applies in connection with gas-filled cylinders or the like wherein the escape of gas is an important factor in loss of pressure within the cylinders or is detrimental to surrounding mechanical structures or nearby individuals.

As will be described in detail immediately hereafter, the sealing ring arrangement and the various forms thereof solves these various problems in a simple and effective manner and commensurate with the necessity for integration thereof with precision devices and other mass production manufacturing techniques.

With reference to the drawing, a piston indicated generally at P is adapted for operation within a cylinder or the like, indicated generally at C. The piston P includes a body portion 10 that may be secured in any suitable manner to a piston operating rod 11 and as by, for example, a plurality of threads 12 adapted for threadable disposition in a bore 13 in the piston. The rod 11 may be locked in position by means of a locknut 14 which threadably engages the rod 12 and abuts one surface of the piston body 10. The particular arrangement of the piston P in connection with the operating rod 11 is by way of example only and many other arrangements may be utilized without departing from the spirit and scope hereof.

In order to support the sealing ring arrangements of the invention, the piston body 10 is provided with an annular groove 15 having an annular radially directed wall 16 and an axially directed wall 17. The groove 15 is further defined by a ring retaining member 18 that may be secured in position as by screws 20 that are threadably disposed in the body 10. The member 18 extends outwardly in a radial direction beyond the surface 16, thus presenting an axially directed wall 21 that provides another side of the groove 15. An outer peripheral edge 22, of the member 18, is spaced substantially from an inner surface 23 of the cylinder C while an outer peripheral surface 24 on the body portion 10 on the piston P is also arranged in spaced relationship to the cylindrical surface 23 of the cylinder. Thus, the piston arrangement P is relatively free to slide within the cylinder C with the ceiling and the piston and the cylinder being accomplished by means of the sealing to be defined hereinafter.

As shown primarily in Figs. 1, 2 and 3, the sealing ring indicated generally at 30 is adapted for disposition within the groove 15 formed in the piston arrangement P. As shown, the ring 30 includes an annular body portion 31 which is generally C-shaped in cross section and annularly integral with no openings whatsoever therein. The general shape of the ring being defined by a generally hyperbolic conical section about a straight line with this line lying in the plane of the section and an axis of the section being parallel to the line.

Accordingly, the body 31 has an outer annular portion 32 and an inner annular portion 33 that are annularly concentric and integral and interconnected by means of a cam interconnecting portion 34. The portion 32 has a sharpened outer edge 35 while the portion 33 has a relatively blunt edge 36, the purpose of which will be later described. It is to be noted that the ring 30 has all portions symmetrical with each other; however, the edge 35 is disposed on a plane lying at a slight angle to a normal of an axis of the ring. The edge 36 lies on a plane that is spaced axially from the edge 35 and arranged on its plane which is normal to the axis of the ring. Thus, the surfaces defined by the edges 35 and 36 are disposed at an angle to each other. It is to be noted, however, that the portion of the edge 35 axially closest to the edge 36 is disposed further radially outwardly than is a like point on a diametrically opposite side of the ring. This particularly is shown in Fig. 1 wherein the portion 32 as shown in the upper half of the drawing engages the wall 23 of the cylinder C at a point and along a line that is axially beyond an outer surface of the retaining member 18. Conversely, the edge 35 of the portion 32 lying in the lower portion of Fig. 1 engages the wall 23 of the cylinder C at a point inwardly from the outer surface of the member 18. Thus, the surface 35 of the ring 30, when moved along the surface 23, serves as a wiper for the surface to remove any liquid that may be thereon and leave other portions of the cylinder in a dry condition.

It is also to be noted that the edge 36 is spaced inwardly from the surface 21 of the member 18, while the outer curved surface of the interconnecting portion 34 is adapted to abut the surface 17 of the groove 15. Thus, as the piston P is moved in the direction of the arrow 37, the ring 30 will perform the beforementioned wiping action with the breakout thereof being in a manner to permit easy initial movement of the piston. It is to be noted further that any further pressure acting within the confines of the ring 30 serve to move the ring radially outwardly, there being creep of the metal thereof in the direction of the arrow 38 in a manner and by a means to be hereinafter more fully described. If desired, the edge 36 may be extended until contact is made with the surface 21 of the member 18 whereby to restrict movement in the direction of the arrow 38 to a predetermined amount. Obviously, when the piston P is moved in the direction of an arrow 40, the ring 30 will be smoothly free to move in that direction along the surface 23 of the cylinder C.

In order that the ring 30 may effectively operate in conjunction with the piston P and the cylinder C, this ring may be made from any suitable metal, and formed by means of any desirable means such as for example, rolling, spinning, drawing or the like, as dictated by particular requirements in particular installational, functional and atmospheric situations. The physical metallic characteristics of the ring 30 are such as to establish considerable resiliency in the material thereof, with such characteristics being established by various known means such as, for example, by cold working of the material, by the means defined hereinbefore. In this connection, it is important that resilient properties of the ring be maintained in order that the desired characteristics may inherently also be maintained. Thus, movement of the ring or deformation thereof in any direction serves merely to deform such ring with the metal thereof thereafter returning to its original configuration. Actually, the outer diameter of the ring 30 is somewhat larger than the diameter of the surface 23 of the cylinder C whereby always to maintain the ring in radial inward compression and to compensate for wear by the biasing of the ring outwardly due to the particular metallic characteristics thereof.

With reference to Figs. 4 through 8, inclusive, it is to be noted that the ring defined generally at **30*a*, 30*b*, 30*c*, 30*d* and 30*e*** may assume various configurations commensurate with the particular installational situations and the particular desired characteristics as far as function is concerned for the present ring. In each of these various forms of the invention, it is to be noted that the various like parts are defined by like reference numerals followed by a letter commensurate with the letter indicating the general particular ring.

With reference with the form of the invention shown in Fig. 4, it is to be noted that the edge **35*a* of the portions 32*a* lies on a plane that is normal to an axis of the ring. Additionally, it is to be noted that the surface 36*a* of the portion 33*a* is angularly disposed with respect to a normal of the axis of the ring 30*a*. Additionally, it is to be noted that the axial length of the portion 33*a* is somewhat greater than the portion 33 on the ring 30, thus to permit this portion to at least partially abut the surface 21 of the retaining member 18 on the piston P** and to effect an asymmetric distortion of the ring when under differential pressure conditions.

In Fig. 5 a ring **30*b* is shown wherein the edge 36*b* of the portion 32*b* and the edge 36*b* of the portion 33*b*** are disposed both at an angle to a normal of the axis thereof. Thus, the ring construction of Fig. 5 permits distortion thereof together with the desired breakout characteristics.

Conversely, the particular ring shown in Fig. 6 at **30*c* is arranged with the edges 35*c* and 36*c* also both at an angle to the normal to an axis of the ring 30*c*; however, the surfaces 35*c* and 36*c*** lie on such planes that are disposed at opposite angles to the normal and on a slope in opposite directions thereto.

The forms of the invention shown in Figs. 7 and 8 are similar with the edges **35*d* and 36*d* and the edges 35*e* and 36*e* being annular and lying on planes that are normal to the axis of the rings 30*d* and 30*e***.

In the form of the invention shown in Fig. 7, however, the portion **33*d* is axially somewhat shorter than the portion 32*d* while the converse is true with the form of the invention shown in Fig. 8 where the portion 33*e* is considerably longer than the portion 32*e***.

With reference to Fig. 1, it is to be noted that the piston P may also be provided with additional sealing rings which face in a direction opposite from the direction of the ring 30. In this instance, a second ring 30' is shown as being disposed in a suitable groove 15' and retained in position by means of a retaining member 18', held in position by bolts 20'. Thus, the piston P may be moved in the direction of either of the arrows 37 or 40 and sealing will be accomplished in both of these directions as set forth hereinbefore in connection with the various rings 30 through **30*e***.

Thus, through utilization of the ring of the present invention and one or the other of the various configurations possible therefor, practically any type of deformation may be induced with regard to movement of the ring under pressure conditions or with different temperature changes thereabout. By this particular arrangement, or by use of one or more of the rings 30 through **30*e*, inclusive, either singly or in back to back or separate combinations, it will be seen further that the unsatisfactory results obtained by prior similar devices will be eliminated. Furthermore, it is to be noted that due to the particular metallic characteristics, the elasticity of the material in the sealing rings 30 through 30*e***, inclusive, remains the same before and after deformation or creeping thereof as defined hereinbefore or after insertion with, without or about other members. Actually, the sealing rings provide primarily at least three points of sealing in most instances, these being at the outer peripheral sharp edges thereof, along the point of abutment of the inner peripheral portions or interconnecting portions of the ring with the side of the associated groove and the contact point between the inner annular portion with either the radially outwardly directed surface of the groove or with the radially extending surface thereof as may be the case for particular configurations of the rings.

Additionally, it is to be noted that the rings may be arranged in back to back relationship in order that sealing may be accomplished in more than one direction, if desired for particular installational situations or in separate grooves.

Having thus described the invention and the present several embodiments thereof, it is desired to emphasize the fact that many further modifications may be resorted to in a manner limited only by a just interpretation of the following claims.

I claim:

1. An annular sealing ring arrangement comprising, in combination: an annular integral ring; a first outer annular portion of said ring; another portion of said ring positioned radially inward and generally concentric with said first portion of said ring; and edges for said portions, said edges being directed in common axial directions and lying on planes spaced axially from each other, said planes further being disposed at an angle to each other.

2. An annular sealing ring arrangement comprising, in combination: an annular integral ring; a first outer annular portion of said ring; another portion of said ring positioned radially inward and generally concentric with said first portion of said ring; and edges for said portions, at least one of said edges being relatively sharp, said edges being directed in common axial directions and lying on planes spaced axially from each other, said planes further being disposed at an angle to each other.

3. An annular sealing ring arrangement comprising, in combination: an annular integral ring; a first outer annular portion of said ring; another portion of said ring positioned radially inward and generally concentric with said first portion of said ring; and edges for said portions, at least one of said edges being relatively sharp, said edges being directed in common axial directions and lying on planes spaced axially from each other, said planes further being disposed at an angle to each other, whereby, upon disposition of said ring in a piston groove, to permit deformation thereof, when under pressure, in a direction extending from the edges of one of said portions toward the other of said edges.

4. In a sealing ring arrangement adapted for use between relatively movable members: an annular integral ring; a groove in one of said members; said ring being adapted for disposition in said groove; concentric portions in said ring, said portions being interconnected to define a generally hyperbolic toroidal configuration, the outermost of said portions being of different radial thickness than the innermost of said portions; and edges on said portions, said edges being directed in common axial directions and lying on planes spaced axially from each other, whereby, upon application of force to one side of said ring to permit deflection thereof in a direction from one of said portions to another.

5. In a sealing ring arrangement adapted for use between relatively movable members: an annular integral ring; a groove in one of said members; said ring being adapted for disposition in said groove; concentric portions in said ring, said portions being interconnected to define a generally hyperbolic toroidal configuration, the outermost of said portions being of different radial thickness than the innermost of said portions; and edges on said portions, said edges being directed in common axial directions and lying on planes spaced axially from each other, said planes further being disposed at an angle to each other, whereby, upon application of force to one side of said ring to permit deflection thereof in a direction from one of said portions to another.

6. A sealing ring arrangement for use between relatively movable members comprising, in combination: an annular integral ring; an annular groove in one of said members; an internal surface on another of said members, said ring being adapted for disposition in said groove with a radial outermost portion thereof in contact with said surface, said ring having a general configuration defined by rotation of a hyperbolic conical section about a straight line with said line lying in the plane of said section, and an axis of said section being parallel to said line, portions of said ring being thereby concentrically disposed; and annular edges on said concentric portions of said ring, said edges being directed in common axial directions and lying on planes substantially normal to said straight line and spaced axially from each other.

7. A sealing ring arrangement for use between relatively movable members comprising, in combination: an annular integral ring; an annular groove in one of said members; an internal surface on another of said members, said ring being adapted for disposition in said groove with a radial outermost portion thereof in contact with said surface, said ring having a general configuration defined by rotation of a hyperbolic conical section about a straight line with said line lying in the plane of said section, and an axis of said section being parallel to said line, portions of said ring being thereby concentrically disposed; and annular edges on said concentric portions of said ring, at least one of said edges being relatively sharp, said edges being directed in common axial directions and lying on planes substantially normal to said straight line and spaced axially from each other.

8. A sealing ring arrangement for use between relatively movable members comprising, in combination: an annular integral ring; an annular groove in one of said members; an annular internal surface on another of said members, said ring being adapted for disposition in said groove with a radial outermost portion thereof in contact with said surface, the outermost diameter of said ring being normally larger than the diameter of said internal surface, said ring having a general configuration defined by rotation of a hyperbolic conical section about a straight line with said line lying in the plane of said section, and an axis of said section being parallel to said line, portions of said ring being thereby concentrically disposed; and annular edges of said concentric portions of said ring, at least one of said edges being relatively sharp, said edges being directed in common axial directions and lying on planes substantially normal to said straight line and spaced axially from each other, said planes of said edges being disposed at an angle to each other.

9. A sealing ring arrangement for use between relatively movable members comprising, in combination: an annular integral ring; an annular generally rectangular in cross section groove in one of said members; an internal annular surface on another of said members, said ring being disposed in said groove with an outermost portion thereof in contact with said surface, said ring having a generally C-shaped configuration defined by rotation of a generally hyperbolic conical section about a straight line with said line lying in the plane of said section, and an axis of said section being parallel to said line, portions of said ring being thereby concentrically disposed; a varying thickness in a wall of said ring, said outermost of said portions having a normal diameter in excess of the diameter of said internal annular surface of said another of said members and a thickness less than that of other portions of said ring disposed at least partially in abutting relationship with one radially extending wall of said generally rectangular groove; and annular edges on said portions, said edges being directed in common axial directions, at least one of said edges lying on a plane disposed at a slight angle to a normal to said straight line and spaced from the other of said edges, said other of the edges being disposed on a plane substantially normal to said straight line.

10. A sealing ring arrangement for use between relatively movable members comprising, in combination: an annular integral ring; an annular generally rectangular in cross section groove in one of said members; an internal annular surface on another of said members, said ring being disposed in said groove with an outermost portion thereof in contact with said surface, said ring having a generally C-shaped configuration defined by rotation of a generally hyperbolic conical section about a straight line with said line lying in a plane of said section, and an axis of said section being parallel to said line, portions of said ring being thereby concentrically disposed; a varying thickness in a wall of said ring, said outermost of said portions having a normal diameter in excess of the diameter of said internal annular surface of said another of said members and a thickness less than that of other portions of said ring disposed at least partially in abutting relationship with one radially extended wall of said generally rectangular groove; and annular edges on said portions, said edges being directed in common axial directions, at least one of said edges lying on a plane disposed at a slight angle to a normal to said straight line and spaced from the other of said edges, said other of the edges being disposed on a plane substantially normal to said straight line, an outermost of said edges being relatively sharp and serving as a wiper along said surface of said another of said members.

11. A sealing ring arrangement for use between relatively movable members comprising, in combination: an annular integral ring; an annular generally rectangular in cross section groove in one of said members; an internal annular surface on another of said members, said ring being disposed in said groove with an outermost portion thereof in contact with said surface, said ring having a generally C-shaped configuration defined by rotation of a generally hyperbolic conical section about a straight line with said line lying in the plane of said section, and an axis of said section being parallel to said line, portions of said ring being thereby concentrically disposed; a varying thickness in a wall of said ring, said outermost of said portions having a normal diameter in excess of the diameter of said internal annular surface of said another of said members and a thickness less than that of other of said portions of said ring, an innermost of said portions of said ring disposed at least partially in abutting relationship with one radially extending wall of said generally rectangular groove; and annular edges on said portions, said edges being directed in common axial directions, both of said edges lying on planes disposed at a slight angle to a normal to said straight line.

12. A sealing ring arrangement for use between relatively movable members comprising, in combination: an annular integral ring; an annular generally rectangular in cross section groove in one of said members; an internal annular surface on another of said members, said ring being disposed in said groove with an outermost portion thereof in contact with said surface, said ring having a generally C-shaped configuration defined by rotation of a generally hyperbolic conical section about a straight line with said line lying in the plane of said section, and an axis of said section being parallel to said line, portions of said ring being thereby concentrically disposed; a varying thickness in a wall of said ring, said outermost of said portions having a normal diameter in excess of the diameter of said internal annular surface of said another of said members and a thickness less than that of other of said portions of said ring, an innermost of said portions of said ring disposed at least partially in abutting relationship with one radially extending wall of said generally rectangular groove; and annular edges on said portions, said edges being directed in common axial directions, both of said edges lying on planes disposed at a slight angle to a normal to straight line, the edge on said outermost portion of said ring being sharp and acting as a wiper along said surface of said another of said members.

References Cited in the file of this patent

UNITED STATES PATENTS

| | | |
|---|---|---|
| Re. 16,978 | Joyce | May 29, 1928 |
| 739,859 | Halsey | Sept. 29, 1903 |
| 2,107,241 | Freer | Feb. 1, 1938 |

FOREIGN PATENTS

| | | |
|---|---|---|
| 768,772 | France | May 28, 1934 |
| 716,867 | Germany | Jan. 30, 1942 |